United States Patent [19]

Luhleich et al.

[11] Patent Number: 4,514,346
[45] Date of Patent: Apr. 30, 1985

[54] METHOD OF MAKING THERMAL-SHOCK RESISTANT MOLDED ARTICLES ON THE BASIS OF SILICON CARBIDE

[75] Inventors: Hartmut Luhleich, Düren; Francisco J. Dias, Jülich, both of Fed. Rep. of Germany

[73] Assignee: Kernforschungsanlage Jülich Gesellschaft Mit Beschrankter Haftung, Jülich, Fed. Rep. of Germany

[21] Appl. No.: 418,679

[22] Filed: Sep. 16, 1982

Related U.S. Application Data

[63] Continuation of Ser. No. 233,475, Feb. 11, 1981, abandoned.

[30] Foreign Application Priority Data

Feb. 15, 1980 [DE] Fed. Rep. of Germany ....... 3005587

[51] Int. Cl.³ .............................................. C04B 35/34
[52] U.S. Cl. .................... 264/29.5; 264/63; 264/65; 501/88; 501/90
[58] Field of Search ............... 264/63, 65, 66, 29.5; 501/88, 90

[56] References Cited

U.S. PATENT DOCUMENTS 3,947,550 3/1976 Fitchmun .............................. 264/63
3,966,855 6/1976 Hollenberg ........................... 264/65
3,998,646 12/1976 Weaner ................................. 501/88

*Primary Examiner*—John A. Parrish
*Attorney, Agent, or Firm*—Frishauf, Holtz, Goodman & Woodward

[57] ABSTRACT

Refractory parts or articles, even of very large dimensions, are made with a starting material of carbon particles mixed with silicon particles in a predetermined ratio which is suspended in a solution of a binder, after which the suspension is squirted into a precipitating liquid to coat the particles with the binder, the solids then being separated and dried, molded under slight pressure, and coked (at 800°–1,000° C.), and then rapidly raised in temperature (to 1,400°–1,600° C.) for formation of silicon carbide throughout the article. It is useful to add powdered silicon carbide and mix it in before the coking step and, also, to hold the heated body at a temperature somewhat below 1,400° C. long enough to remove temperature gradients within it, followed by rapid heating up to a carbide-forming temperature. The porous bodies thus formed can be heated to reduce porosity after the coking step by impregnation with a suspension of silicon powder in a resin, after which the body is again coked, or impregnation may be carried out on the completely fired body, with a liquid resin or a molten metal, after evacuation of the porous body and the application of pressure to the impregnating fluid.

11 Claims, No Drawings

METHOD OF MAKING THERMAL-SHOCK RESISTANT MOLDED ARTICLES ON THE BASIS OF SILICON CARBIDE

This is a continuation of application Ser. No. 233,475, filed Feb. 11, 1981, now abandoned.

The invention concerns the process for producing molded bodies from a raw material of powder or granular form, including ground coke, electrographite, natural graphite, charcoal, carbon black, or the like, in which the grains or powder particles are coated with an organic binder and in an immediately following process step, the mass so formed is molded in some particular way as a "green" body and then coked, heating it to a temperature of 800° C. to 1,000° C. In particular, the invention concerns producing a highly cohesive body having high resistance to thermal shock by such a process as the result of including silicon as a material entering into the process and the formation of silicon carbide.

Molded bodies utilizing carbon with addition of silicon for the formation of silicon carbide, with or without addition of silicon carbide, are known. Molded parts produced of these materials are of increasing significance in industry today. These molded bodies have a high temperature stability and a high capability of withstanding temperature changes. They also have great strength and, in comparison with metals, low density, as well as a very good resistance to corrosion compared to most substances, particularly with regard to oxygen and water. Furthermore, the raw materials for these articles are economical and their supply is assured for a long time.

A series of processes are known by which molded bodies of the general kind above described can be made. Thus, there is known, for example, a process commonly referred to as the "hot press process." In this process silicon carbide is pressed at temperatures from 1,750° C. to 2,200° C. with the application of pressure of between 200 and 2,000 bar.

Although the known process makes possible the production of moldings not only of simple shape, but also of complicated shape, as for example, components of hot gas turbines, when such articles are produced by this known process, time-consuming and costly mechanical machining is necessary for completion of such articles. Furthermore, moldings made by this process generally contain foreign elements, as for example, boron or magnesium, that are added as sintering aids in the sintering process utilized in manufacture. This is particularly disadvantageous regarding the strength or cohesion of the product, particularly for cases in which molded bodies made by this process are exposed to high temperatures. Apart from that disadvantage, such components are not usable as nuclear reactor components if boron is added as a sintering aid because boron is a neutron absorber. There is still another disadvantage in that the size of the molded parts is not entirely a matter of choice but must depend upon the necessarily limited size of the hot press. This known process is therefore very expensive since it requires high investment cost, a great expenditure of energy and expensive subsequent machining of the molded bodies.

In another known process, disclosed in U.S. Pat. No. 3,591,840 and DE-OS No. 2 627 856, which starts with the utilization of α and β silicon carbide powders of a grain size in the region of 1 μm, the sintering procedure takes place without the application of pressure. This result is obtained by the choice of a suitable mixture ratio of α and β silicon carbide and by the use of particular additives. The necessary molding is then performed by pressing, extruding, slip-casting, or the like. To the extent that lubricants are used, care must be taken that the following sintering step is not impaired. The temperatures for the necessary reactive sintering lie between 1,900° C. and 2,100° C. The sintering atmosphere is argon and the pressure is about 1 bar.

It is disadvantageous in this process, however, that just as in the previously mentioned "hot press process," foreign element additives must be used with all their resulting further disadvantages. The expense for the manufacture and mixing of the powders used, moreover, is not inconsiderable, because a previous precipitation in the gas phase is necessary for producing the β silicon carbide. A further disadvantage is that a small quantity of oxygen adhering to the surface of the grains or particles is not fully removed by carbon in the conversion reaction with the normally added carbon, so that the sintering operation is somewhat impaired.

There is also known a reactive sinter process in which the bonding of silicon carbide particles is obtained by first adding carbon powder to the silicon carbide particles so that the carbon powder will react with silicon vapor or liquid silicon to form silicon carbide which will coalesce with the silicon carbide particles and bind them together. The siliconizing is carried out in protective gas at a temperature between about 1,500° C. and 2,300° C. In this case, operation is possible both under normal pressure and under reduced pressure (see U.S. Pat. No. 3,275,722 and G.B. Pat. No. 866,813).

The conversion times for this known process lie between a few minutes and several hours, according to the particular conditions of the operation. The disadvantages of this known process are that when liquid silicon is used, the molded body must be dipped in the silicon bath for siliconizing and thereafter the surface of the body must be freed of any adhering silicon. The dipping process, moreover, comes into consideration only for relatively thin wall thicknesses, since even when an article has previously been made with sufficient porosity, the penetration depth of the liquid silicon does not extend deeper than about 10 mm. On the other hand, if the molded body is brought into a silicon vapor atmosphere for siliconizing, the reaction time is very long and, as a result thereof, the energy consumption is very high. The molded bodies made by this process consist of a porous silicon carbide skeleton, having pores filled with silicon. The use of a silicon bath has the disadvantage that the service life of the container for the bath is dependent to a high degree from the particular operating conditions and is in any event quite limited, so that the process is consequently expensive. Finally, there is also the disadvantage that in this process, too, the size of the molded bodies produced therewith is limited.

A modification of this known reactive sinter process is the siliconizing of molded bodies of carbon with liquid or gaseous silicon to form silicon carbide. In this process, too, it is necessary that the molded bodies have a sufficient and open porosity. Consequently, the dimensions of the molded bodies to be made and siliconized according to this process are limited by the penetration depth of the silicon.

All the above-mentioned processes belonging to the presently known art have the disadvantage that the molded bodies produced by the known process can be machined only with the use of diamond-tipped tools.

SUMMARY OF THE INVENTION

It is the object of this invention to provide a process for the production of uniformly and throughgoingly porous molded bodies from powderlike or granular material that is operable in an economic fashion, thus, with relatively small energy consumption, in a relatively short time, without utilization of devices of short service life and without application of high pressures. It is a further object that such a process should enable the manufacture of molded bodies requiring either no machining or similar finishing, or in case high precision of measurements are required, are capable of machining with tools having no special requirements regarding their hardness. It is also an object of the invention to make denser shaped bodies by filling the pores of molded bodies of the invention with resin or metal.

Briefly, the starting material is a mixture of granular and/or powder silicon and carbon powder used in a predetermined mixing ratio, the grains being evenly coted with the binder, and a molded body made therefrom is, after coking rapidly heated to a temperature between about 1,400° C. and 1,600° C. in an inert gas atmosphere under a pressure of at least 1 bar, in order to prevent the evaporation of silicon and to produce the conversion of carbon and silicon—into silicon carbide. For the best results, a relatively high proportion of a binder capable of being coked, preferably about 20 to 35% by weight of the green body, is distributed uniformly over the silicon and carbon grains, the thus obtained powder mixture being easily moldable. Minor amounts of binder (e.g. 15%) could be used corresponding to the specific surface of the starting powder mixture. This binder must be evenly distributed over the surface of the powder grains and should leave after coking relatively much carbon as binder coke on the surface of the particles so that beginning with these powder grain surfaces, a penetrating uniform reaction can take place for the conversion of silicon and carbon to silicon carbide.

As binder materials those are preferred that leave a carbon residue of at least about 40% by weight (with reference to the original weight of binder) after coking. Usable resins are particularly phenol formaldehyde resins whether catalysed with acid or alkali or both and their analogs and/or deratives, for example, melamine resins, thiourea-phenol resins, urea-phenol resins, formaldehyde-resorcinol resins, furfural resins, and the like, all of which are well known to those skilled in the art.

The evenness of the distribution of the relatively high binder content over the surfaces of the powder uniformly coating the grains as obtained by the process according to U.S. Pat. No. 4,009,143 has the significance that in consequence the body finally formed by conversion of carbon and silicon has a uniform porosity. This porosity goes all the way through. Particles or parts produced according to the invention can be utilized successfully as filters or high-strength structural elements. If dense bodies are desired, the pores can be filled in a subsequent stage with materials of various kinds, as further described below, for example, by impregnating the bodies with molten material. It is also possible, if desired, after an intermediate treatment for machining of the relatively easily worked porous body to provide s subsequent impregnation of the pores with a silicon-carbide mixture containing binder and to repeat the coking and active conversion treatment according to the invention.

The porosity of the SiC body to be impregnated normally lies between 30 and 70%, preferably 40 to 50%, while the pore sizes, which are dependent upon the grain size of the starting material, lie between about 1 to 500 $\mu$m, preferably between 5 to 30 $\mu$m. As starting powder, mill products with a maximum grain size of up to 100 $\mu$m, preferably up to 60 $\mu$m for carbon and up to 50 $\mu$m and particularly to 10 or 20 $\mu$m for silicon are used.

The mole ratio of silicon to carbon depends slightly on the desired properties of the molded body to be made and in accordance therewith lies between 0.8 and 1.2. The carbon set free by the binder is to be taken into account for the chemical conversion.

The advantage of the process of the invention is that coked bodies can be produced in large dimensions, have good qualities for mechanical working and, hence, when high dimensional accuracy is important, can be easily machined to size.

A particularly useful development of the process of the invention utilizes the formation of a binder solution in which grains or particles are suspended as the starting point for the provision of grains and/or particles coated with binder, the slurry or suspension then being introduced through a nozzle into a liquid serving to precipitate the binder, as the result of which the grains or particles are evenly coated with the binder, after which in a following process step, the mass of grains or particles evenly coated with a binder film can be separated by filtration or decantation from the precipitating liquid and dried, as particularly described in U.S. Pat. No. 4,009,143.

This elaboration of the process according to the invention has the advantage that the grains and/or particles surrounded by the binder in the mixture are very evenly coated with the binder and, in consequence, after coking, are likewise evenly coated with the binder coke into which the binder is converted. This variant of the process according to the invention has the further advantage that in the siliconizing step, each silicon grain or particle reacts with its entire surface with the carbon of the binder coke.

The siliconizing step, accordingly, proceeds evenly on a micro-region scale with high uniformity. The further advantage therefore results that the reaction heat that is produced suffices to bring into the reaction nearby carbon grains or particles coated with binder. The siliconizing step is additionally promoted by the characteristic reactivity of the binder coke. A further quite appreciable advantage of the provision, according to the invention, of a coating of particles with binder coke is that the residual oxygen that naturally persists in very slight quantity on the surface of the silicon is removed completely and very early in the reaction from the entire silicon surface. Only thus is it possible to obtain molded bodies in which even in micro-regions a homogeneous and uniform bond of silicon carbide particles formed in this way is present.

If, in accordance with the process of the invention molded bodies are produced from powders of which the grains or particles have previously been coated with binder, the production of silicon carbide bodies of complicated shape is also made possible because the mass formed from the mixture prepared in the manner above described is readily molded either without the application of pressure or, in any event, with the application of only small pressing pressure.

The fidelity to the design shape of the molded body to be produced with reference to a prescribed model or pattern can be still further increased if the dimensions of the molded body during the conversion of silicon and carbon to silicon carbide change isotropically and merely in such a small proportion that the molded body thus produced in quantity is ready without further finishing to correspond to the requirements of the intended use. For such purpose, it is very simply possible to take account in the molding process of the shrinking that takes place during coking and the very slight change of volume in siliconizing.

It should be mentioned in this connection, for comparison purposes, that a process is already known for the production of molded bodies with a core of carbon and a protective outer layer of carbide. In that process, as disclosed in copending U.S. patent application Ser. No. 94,120, filed on Nov. 14, 1979, and also in the corresponding published German Patent Application (AS) No. 2 718 143, a molded body is first produced of graphite particles coated with a "cokable" binder. Then, one or more coatings are applied to the molded body as a layer or layers of carbon powder to which silicon powder has been mixed in an atomic proportion with respect to the silicon and carbon powder mixture mass between nearly zero and 50%.

This is done in such a way that the layer nearest to the previously molded body has the lowest and the layer on the outside has the highest silicon content. The body thus provided with protective layers is then coked in a protective gas atmosphere at temperatures between 650° C. and 850° C. and immediately thereafter, for the purpose of forming silicon carbide in the outer layers, is brought with great heating-up speed to a temperature of from 1,550° C. to 1,800° C.

Also known is a process for the production of molded bodies made of graphite with a protective layer of carbide in which the carbide content increases to the outside, in which process silicon is suspended in a phenol formaldehyde binder solution also containing graphite powder in suspension and the molded body is then dipped one or more times in this suspension. Thereafter, the molded body is coked and then for the formation of the outer layer of silicon carbide, it is brought quickly to a temperature of between 1,500° C. and 1,800° C. This process is also disclosed in the references last cited.

Molded bodies of the kind disclosed in those references particularly find application in chemical industry as crucibles or other containers for uses in which it is important to carry out reactions at high temperatures. They have the advantage of being resistant to corrosion. They have a limited field of application, however, because they are not capable of withstanding impact, concussion and bending stresses.

In the cases in which it is aimed to set up the process of the invention still more economically, because the significance of the process depends quite distinctly upon economy, it is advantageous to add a predetermined quantity of silicon carbide to the mixture of silicon and carbon making up the mixed powder.

In the case of the variant just mentioned of the process of the invention in which a suspension of the mixture of only carbon and silicon powder is normally used, it is particularly useful, accordingly, that silicon carbide powder should be added to the binder-coated silicon and carbon particles in such a way that the silicon carbide particles will be coated with the binder. The binder content for the process according to the invention lies between 20% and 35% by weight, with reference to the weight of the entire mass.

The molding of the mass formed out of the mixture is preferably carried out by extrusion in the particular desired shape, of the mass made from the coated materials. Another useful procedure is to shape the mass made up of the starting materials by means of a die press with use of a slight pressure.

In order to assure that silicon carbide formation extends into the core of the body even in molded bodies of larger dimensions and to prevent that temperature inhomogeneities should arise during the reaction, it is advantageous that the molded body formed after coking in a protective gas atmosphere should be raised to a temperature of about 1,350° C. to 1,400° C. and maintained at this temperature until almost no temperature gradient exists any more within the molded body and immediately thereafter, with the greatest possible speed (which is limited by the oven capacity) to heat it up further to a temperature in the region between about 1,500° C. and 1,600° C., and after the completion of the conversion of silicon and carbon into silicon carbide, to cool the body down.

If molded bodies to be produced must meet especially high dimensional precision, it is readily possible to subject the molded body as it is after coking to a mechanical finishing, or machining, or further shaping.

If particles of complicated shape are to be produced according to the invention, as for example, impeller wheel bladed crowns for hot-gas turbines, it has been found advantageous first to make moldings of individual parts ("part moldings") and then, before further treatment, to assemble the complete molding to be produced by bonding methods or means, such as screws, clips, plug connectors or the like. If then a molded body built up in this manner from individual parts is heated in an inert gas atmosphere to a temperature between 1,440° C. and 1,600° C., corresponding to the process step provided in the process according to the invention, the conversion of silicon and carbon to silicon carbide then taking place will so mutually connect the individual parts that a fully integrated entire body is produced.

For the cases in which it is important to produce a molded body with relatively slight porosity, there is an advantageous new development of the process of the invention by which the porous molded body as it exists after coking is impregnated or soaked with silicon powder suspended in synthetic resin and then coked again, and after coking, converted according to the invention at 1,400° to 1,600° C.

In order to produce dense molded bodies, particularly molded bodies impermeable to gas and liquid, the process according to the invention is carried out in such a way that the molded body having pores penetrating completely through it as it exists after the conversion of silicon and carbon, is soaked or impregnated with liquid material, such as synthetic resins or metals, particularly metal alloys or hard metals. The soaking or impregnation is done in a pressure vessel in which the porous articles are first evacuated and then dipped in the liquid provided for soaking or impregnation, with a pressure up to 50 bar being exerted on the liquid. In this manner a combined body is formed in which a silicon carbide skeleton is locked into the body of another material contained within the skeletal structure.

If, for example, metal is used for soaking or impregnating, the result is a body which possesses the high-hardness properties and the high crush resistance of silicon carbide, while at the same time, as the result of the interlocking with the metal used, the high bending and shear resistance of the latter. The overall properties of a body so formed are not obtainable with the individual components alone. In addition, there is the further advantageous property of the comparatively low weight of such molded bodies as the result of the low density of the silicon carbide.

In order to make molded articles composed of a number of individual parts, in the particular case that connection elements are used for fastening, it is effective to use the process of the invention also for the production of these connecting or fastening elements.

Porous silicon carbide bodies produced according to the process of the invention are suitable for many application fields. They can be used, for example, as filter plates for hot gas filtration. Impregnated with another material, for example, metal, they are usable for seals of the slipring type. They are also usable as mold materials in foundries or in the rubber industry or the glass industry. Even the foregoing examples do not exhaust the variety of application fields for which the products of the process of the invention may be suitable.

EXAMPLE

For production of a silicon carbide body, 500 g of fine-ground silicon powder was mixed with 305.6 g of a novolac resin powder and 38.7 g of an electrographite filler with a maximum grain size of 60 μm, as follows:

With addition of 10 ml acetic acid, the binder resin was dissolved in 900 ml of ethyl alcohol and warmed to 50° C. With continuous stirring there were added, one after the other, the silicon powder and the carbon powder and the mixture was stirred for about one-half hour. Then the suspension was cooled to 20° C. and mixed with 20 liters of cold water by means of a mixing valve. The novolac binder was thereby evenly precipitated onto the silicon and carbon powder grains. Thereafter, the suspension was warmed to 40° C. with stirring and then cooled down to 20° C. Following that cooling the muddy sediment formed upon settling was decanted, filtered, and dried. 80.5 g of the powder mixture so produced was put into a small cylindrical mold box with a ram, heated up to 110° C. and pressed with 20 bar of pressure. The green body thus obtained had a density of 1.34 g/cm$^3$. It was coked by heating up in an inert gas atmosphere to 800° C. and then rapidly raised in temperature, at 5° C. per minute, to 1,600° C. After cooling down, a molded body was obtained that consisted of porous silicon carbide. The density of the molded body was measured at 1.42 g/cm$^3$.

We claim:

1. A process for the production of homogeneous and uniformly and throughgoingly porous molded articles or parts, utilizing carbonaceous particles selected from the group consisting of ground coke, natural graphite, electrographite, charcoal, and carbon black, as a starting material in the form of powder or granules, and including the steps of coating particles of said powder or granular material wih an organic binder, molding a mass of the coated particle to form a "green" molded body, and coking said body up to a maximal temperature in the range from 800° to 1,000° C., said process comprising the improvement which consists in that:

the powdery or granular starting material is a mixture consisting essentially of particles of silicon and said carbonaceous particles in a predetermined mixture proportion and containing substantially no silicon carbide particles;

the coating of the particles with a binder is performed the binder is precipitated by introducing the suspension into a liquid serving to precipitate the binder on the particles as an even coating;

after the coking step, the molded body is heated up, to convert silicon and carbon into silicon carbide, to a temperature in the range from 1,400° C. to 1,600° C., in an inert gas atmosphere at a pressure not less than about 1 bar, said heating up, at least in the temperature range around and above 1,400° C., being at a rapid rate, in order to mitigate the evaporation of silicon.

2. A process as defined in claim 1, wherein the proportional content by weight of binder in the coated particle mixture with reference to the weight of the coated particle mixture is between 20% and 35%.

3. A process as defined in claim 1, wherein the step of molding said mass of coated particles is performed by extrusion.

4. A process as defined in claim 1, wherein the step of molding said mass of molded particles is performed by die-pressing under not more than a slight pressure.

5. A process as defined in claim 1, wherein said coking step is carried out in a protective gas atmosphere and wherein the following heating-up step is carried out by first heating up said molded body to a temperature in the range between 1,350° C. and 1,400° C., then maintaining it at a temperature in said last-mentioned range long enough practically to prevent a temperature gradient from remaining within said body and then heating up said body with great rapidity to a temperature in the range between 1,500° and 1,600° C., and after the conversion of silicon and carbon in said body into silicon carbide, cooling said body.

6. A process as defined in claim 1, wherein the process is carried out by producing a plurality of molded parts which are fastened together during the process to form an article of complicated shape, this fastening together being done at least before the conversion step.

7. A process as defined in claim 1, wherein after the cooling step the molded body is machined to obtain final dimensions.

8. A process for the production of molded articles or parts, utilizing carbonaceous particles selected from the group consisting of ground coke, natural graphite, electro-graphite, charcoal, and carbon black, as a starting material, in the form of powders or granules and including the steps of coating particles of said powder or granular material with an organic binder, molding a mass of the coated particles to form a "green" molded body, and coking said body up to a maximal temperature in the range from 800° C. to 1,000° C., said process comprising the improvement which consists in that:

the powdery or granular starting material is a mixture consisting essentially of particles of silicon and said carbonaceous particles in a predetermined mixture proportion the coating of the particles with a binder is performed by suspending the particles in a binder solution from which the binder is precipitated by introducing the suspension into a liquid serving to precipitate the binder on the particles as an even coating;

after the first coking step, said molded body, in order to reduce the porosity thereof, is soaked or impregnated with a suspension of silicon powder in synthethic resin and then subjected to a further coking step;

after said further coking step, the molded body is heated up, to convert silicon and carbon into silicon carbide, to a temperature in the range from 1,400° C. to 1,600° C., in an inert gas atmosphere at a pressure not less than about 1 bar, said heating up, at least in the temperature range around and above 1,400° C., being at a rapid rate in order to mitigate the evaporation of silicon.

9. A process for the production of molded articles or parts, utilizing carbonaceous particles selected from the group consisting of ground coke, natural graphite, electro-graphite, charcoal, carbon black and other carbonized organic material, as a starting material in the form of powders or granules, and including the steps of coating particles of said powder or granular material with an organic binder, molding a mass of the coated particles to form a "green" molded body, and coking said body up to a maximal temperature in the range from 800° C. to 1,000° C., said process comprising the improvement which consists in that:

the powdery or granular starting material is a mixture consisting essentially of particles of silicon and said carbonaceous particles in a predetermined mixture proportion;

the coating of the particles with the binder is performed by suspending the particles in a binder solution from which the binder is precipitated by introducing the suspension into a liquid serving to precipitate the binder on the particles as an even coating;

after the coking step, the molded body is heated up, to convert silicon and carbon into silicon carbide, to a temperature in the range from 1,400° C. to 1,600° C., in an inert gas atmosphere at a pressure not less than about 1 bar, said heating-up, at least in the temperature range around and above 1,400° C., being at a rapid rate in order to mitigate the evaporation of silicon, and after the conversion of silicon and carbon into silicon carbide as aforesaid, said molded body is soaked in or impregnated with molten metal while contained in a pressure vessel, the interior of which is evacuated when or soon after said body is first placed therein, and not in contact with said molten metal, said molten metal has a pressure applied to it which does not exceed 50 bars.

10. A process for the production of molded articles or parts, utilizing carbonaceous particles selected from the group consisting of ground coke, natural graphite, electro-graphite, charcoal, carbon black and other carbonized organic material, as a starting material in the form of powders or granules, and including the steps of coating particles of said powder or granular material with an organic binder, molding a mass of the coated particles to form a "green" molded body, and coking said body up to a maximal temperature in the range from 800° C. to 1,000° C., said process comprising the improvement which consists in that:

the powdery or granular starting material is of a mixture consisting essentially of particles of silicon and said carbonaceous particles in a predetermined mixture porportion;

the coating of the particles with the binder is performed by suspending the particles in a binder solution from which the binder is precipitated by introducing the suspension into a liquid serving to precipitate the binder on the particles as an even coating;

after the coking step, the molded body is heated up, to convert silicon and carbon into silicon carbide, to a temperature in the range from 1,400° C. to 1,600° C., in an inert gas atmosphere at a pressure not less than about 1 bar, said heating-up, at least in the temperature range around and above 1,400° C., being at a rapid rate in order to mitigate the evaporation of silicon, and after the conversion of silicon and carbon into silicon carbide as aforesaid, said molded body is soaked in or impregnated with synthetic resin while contained in a pressure vessel, the interior of which is evacuated when or soon after said body is first placed therein, and not in contact with said synthetic resin, said synthetic resin has a pressure applied to it which does not exceed 50 bars.

11. A process for the production of homogeneous and uniformly and throughgoingly porous molded articles or parts, utilizing carbonaceous particles selected from the group consisting of ground coke, natural graphite, electrographite, charcoal, and carbon black material, as a starting material in the form of powder or granules, and including the steps of coating said particles with an organic binder, molding a mass of the coated particles to form a "green" molded body, and coking said body up to a maximal temperature in the range from 800° to 1000° C., said process comprising the improvement which consists in that:

the powdery or granular starting material is a mixture consisting of particles of silicon, said carbonaceous particles, and particles of silicon carbide, in a predetermined mixture proportion;

the coating of the particles with a binder is performed by suspending the particles in a binder solution from which the binder is precipitated by introducing the suspension into a liquid serving to precipitate the binder on the particles as an even coating;

after the coking step, the molded body is heated up, to convert silicon and carbon into silicon carbide, to a temperature in the range from 1,400° C. to 1,600° C., in an inert gas atmosphere at a pressure not less than about 1 bar, said heating up, at least in the temperature range around and above 1,400° C., being at a rapid rate, in order to mitigate the evaporation of silicon.

* * * * *

UNITED STATES PATENT AND TRADEMARK OFFICE
CERTIFICATE OF CORRECTION

PATENT NO. : 4,514,346
DATED : April 30, 1985
INVENTOR(S) : Hartmut LUHLEICH et al.

It is certified that error appears in the above-identified patent and that said Letters Patent is hereby corrected as shown below:

In Column 8, claims 2, 3, 4, 5, 6 and 7, line 1 of each claim thereof, "claim 1" should read -- claim 1 or claim 11 --.

Signed and Sealed this

Twenty-eighth Day of January 1986

[SEAL]

Attest:

DONALD J. QUIGG

Attesting Officer

Commissioner of Patents and Trademarks